(No Model.) 3 Sheets—Sheet 1.

H. J. DOUGHTY.
METHOD OF AND APPARATUS FOR MAKING TIRE COVERS FOR VELOCIPEDES.

No. 560,123. Patented May 12, 1896.

Witnesses
A. A. Dobson
I. A. Fairgrieve

Henry J. Doughty
Inventor
By Foster & Freeman
Attorneys (No Model.) 3 Sheets—Sheet 2.

H. J. DOUGHTY.
METHOD OF AND APPARATUS FOR MAKING TIRE COVERS FOR VELOCIPEDES.

No. 560,123. Patented May 12, 1896.

(No Model.)  3 Sheets—Sheet 3.

H. J. DOUGHTY.
METHOD OF AND APPARATUS FOR MAKING TIRE COVERS FOR VELOCIPEDES.

No. 560,123.  Patented May 12, 1896.

Witnesses
A. N. Dobson
J. A. Fairgrieve

Henry J. Doughty
Inventor
By Foster & Freeman
Attorneys

UNITED STATES PATENT OFFICE.

HENRY J. DOUGHTY, OF PROVIDENCE, RHODE ISLAND.

METHOD OF AND APPARATUS FOR MAKING TIRE-COVERS FOR VELOCIPEDES.

SPECIFICATION forming part of Letters Patent No. 560,123, dated May 12, 1896.

Application filed December 20, 1894. Serial No. 532,469. (No model.)

*To all whom it may concern:*

Be it known that I, HENRY J. DOUGHTY, a citizen of the United States, residing in Providence, Providence county, Rhode Island, have invented certain new and useful Improvements in Methods of and Apparatus for Making Tire-Covers for Velocipedes, of which the following is a specification.

My invention has for its object to rapidly, economically, and effectually form the continuous covers that are used for the tires of velocipedes; and to this end I make use of the process and apparatus fully set forth hereinafter, and illustrated in and by the accompanying drawings, in which—

Figure 1:
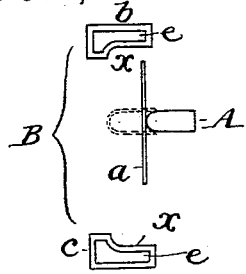
Figure 1:
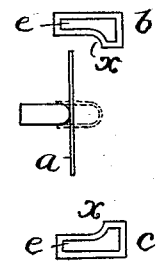
Figure 2:
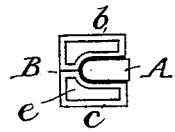
Figure 2:
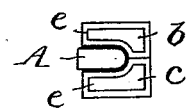
Figure 3:
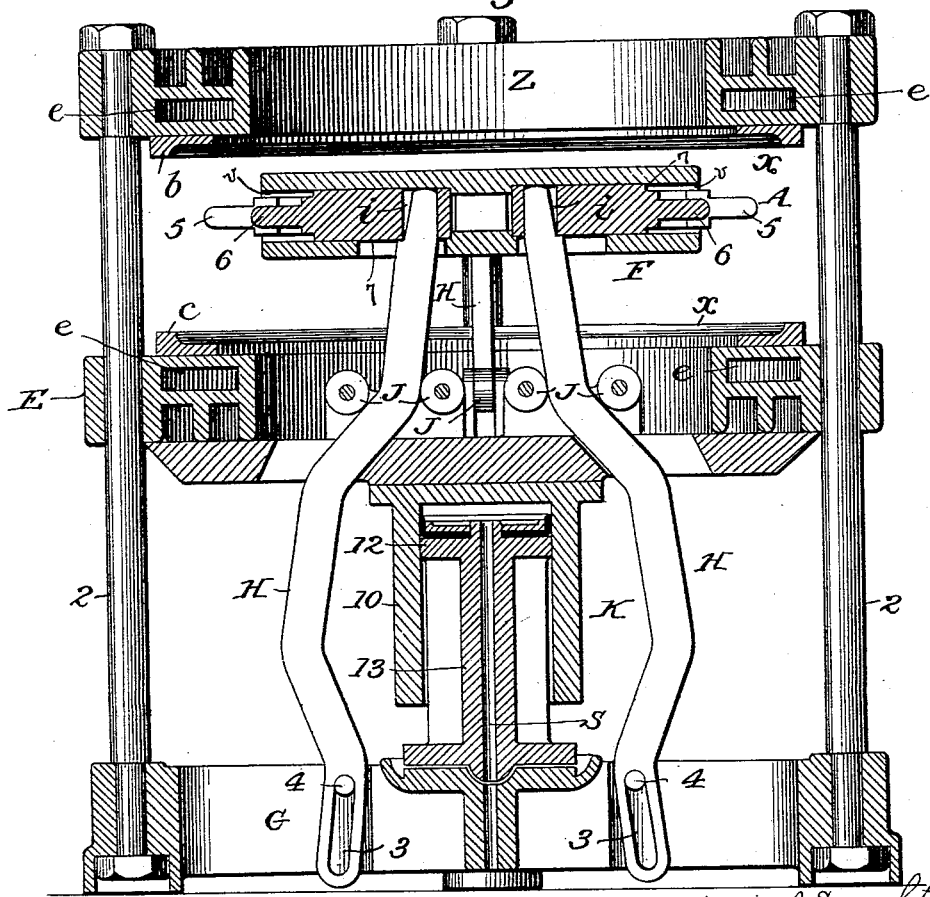
Figure 4:
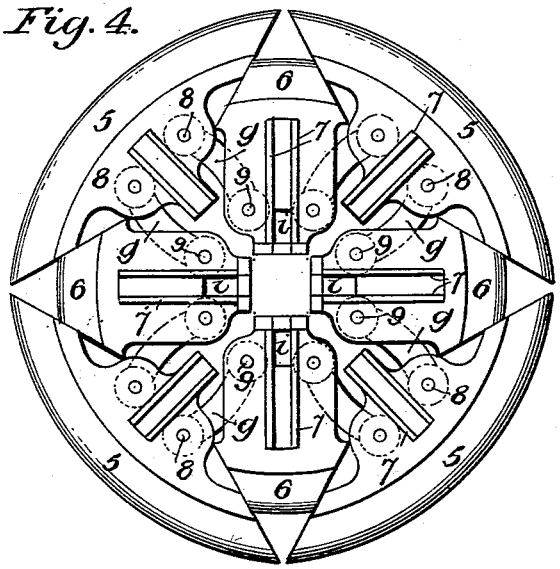
Figure 5:
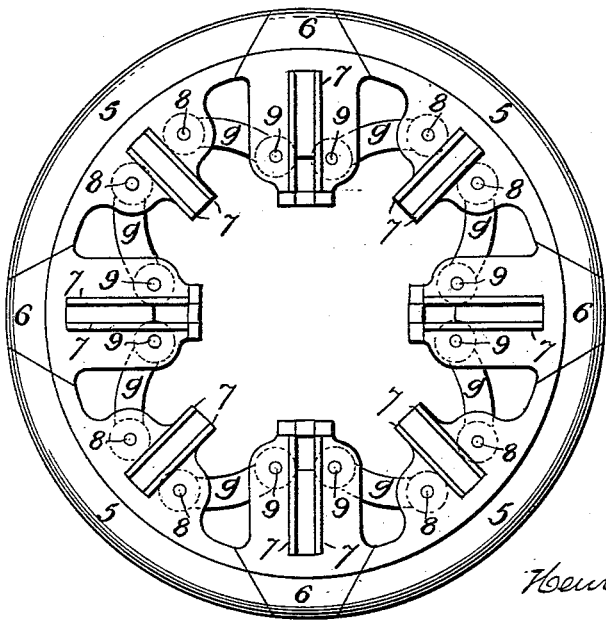
Figure 6:
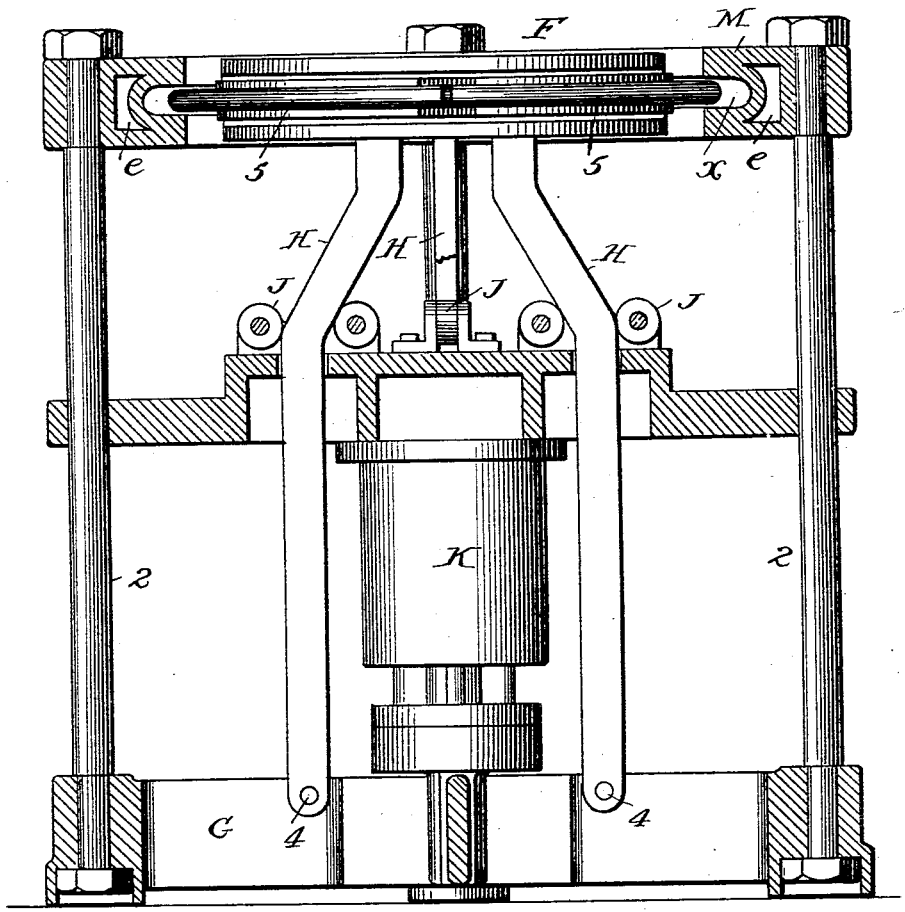

Figures 1 and 2 are views illustrating diagrammatically the operations and features of my improved process and apparatus. Fig. 3 is a sectional elevation of the complete apparatus; Fig. 4, a plan view of the "former" contracted; Fig. 5, a plan view of the former expanded. Fig. 6 is a vertical sectional view of a modification of the combined mold and vulcanizer.

Before referring to the details of the mechanism embodying and carrying out my improvements I will refer to the diagrams, Figs. 1 and 2, which illustrate without regard to special construction the main steps of the operations and means employed.

A represents an expansible former of circular shape when expanded and constructed in any suitable manner to insure such expansion and of such form as circumstances may demand. The said former is contracted to receive the cover-strip $a$. This strip consists of any suitable material—as, for instance, a web of knitted, woven, or braided fabric in the form of a strip with its ends connected together or knit or woven of a circular shape—and which is either put upon the former while it is contracted and coated after the former is expanded, or it is coated with suitable material, as rubber compound, and then placed upon the former, the center of the strip being opposite the edge of the former. In either case the expansion of the former after the strip is applied will distend the center portion of the strip and cause the edges to close round upon the former, as indicated in dotted lines, Fig. 1. A flat strip may thus be formed up into proper shape by the mere expansion of the former.

Heretofore it has been common to remove the strip from its mold or former after it has been brought to the proper shape thereon or to remove the former and strip together to the baking-oven where the material is vulcanized. This is attended with loss of time, expense, and other disadvantages, which it is one object of my improvement to avoid, and to this end I combine with the expansible former a combined mold and vulcanizer. Said mold and vulcanizer is capable of being constructed in a variety of different ways, and is either a one-part mold or a two-part mold, accordingly as may be preferred.

As illustrated in Figs. 1 to 5, the mold B, in one instance, consists of two circular dies or parts $b$ $c$, each having a recess $x$ of such shape that when the two parts are together, as shown in Fig. 2, the said recess $x$ will constitute a mold of the proper dimensions to receive the edge of the former and its strip and impart to the tire-cover its proper shape as the former is brought between the dies constituting the mold, and these dies or parts $b$ $c$ are made hollow with recesses or chambers $e$ to receive steam or hot air, by which they are heated to the desired temperature and maintained at said temperature for sufficient length of time. The mold is then opened, the former and its cover separated therefrom, the former is contracted, and the tire-cover in its finished and perfected shape, so far as molding and vulcanizing are concerned, is removed to give place to another circular strip $a$, which is operated upon in like manner. Thus by a single series of operations in one machine I mold, shape, and vulcanize the circular covers.

It will be evident that expansible formers may be made and expanded in different ways and that the separable molds may be made in different ways and that they may be heated by steam or hot air or by gas-flame or electricity or any suitable manner, and I will now describe one construction which has proved to be effective and which is illustrated in Figs. 3 to 5. In said figures the frame of the machine consists of a lower ring G and an upper ring Z, the latter supporting the upper die $b$ of the divisible mold, and preferably this section is in the form of a ring separably connected to the ring Z, and the heating-chamber $e$ is in the latter. I can thus substitute rings $b$ of different forms and proportions without changing the part that has the heating-chamber in it. The lower section or die $c$ of the mold is also in the form of a ring connected detachably to a sliding frame E, which has in it the heating-chamber $e$ and which is moved up and down upon connecting-rods 2 2, that connect the rings G Z.

Between the frame E and the ring Z is arranged a frame F, which carries the former A. As shown, the said former consists of four curved sections 5 5 5 5 and four wedge-like sections 6 6 6 6, the ends of the sections 5 being beveled to correspond to beveled sides of the sections 6 in such manner that when the former is expanded, as shown in Fig. 5, the outer edges of all the sections will correspond to the same circle, and when the former is contracted, as shown in Fig. 4, the ends of the sections 5 will nearly be in contact. The sections 5 and 6 are provided with radial ribs 7, adapted to radial grooves $v$ in the frame F, which guide the sections so they can slide radially in and out, and the sections 5 are connected with the sections 6 by means of links $g$, pivoted at 8 to the sections 5 and at 9 to the sections 6, as shown. In consequence of this arrangement if the sections 6 are moved outward they will carry with them the said sections 5; but as the former expands the travel of the sections 6 will increase relative to the sections 5 until the edges of all the sections coincide with the same circle. When the sections 6 are drawn back, the sections 5 will be drawn radially inward and their ends will approach each other until they nearly meet, as shown in Fig. 4.

Different means may be employed for imparting movement to the sections 6. I have shown a series of bent levers H, which extend between roller-bearings J upon the frame E, their upper ends projecting into recesses $i$ in the sections 6 and their lower ends having slots 3, receiving guide-pins 4. By this arrangement, when the frame E is moved upward, the bearings J, acting upon the levers H, first carry the latter outward to expand the former wholly or partially, and then as the die $c$ is brought against the strip upon the former the frame F is lifted, carrying upward also the levers H until the two dies of the mold are brought together. When the frame E descends, the reverse operation takes place.

Different mechanisms may be used for raising and lowering the frame E. I prefer to use an engine K, consisting of a cylinder 10, secured to the frame E, and the properly-packed piston 12, fitting the piston and secured to a hollow stem 13, affixed to the hub of a cross-piece extending across the ring G. Suitable means of introducing water or other fluid under pressure to the channel S of the stem 13 are provided, whereby to fill the space above the piston and lift the frame E, and also for exhausting the fluid, allowing the frame to descend by its weight.

Referring to the modification shown in Fig. 6, it will be seen that the combined mold and vulcanizer M is formed all in one, and which enables me to perform the operation hereinbefore referred to by the use of a fewer number of parts. In this construction also it will be seen that the levers which operate the formers are simply pivoted at their lower ends at 4, instead of being slotted, since no vertical movement of said levers is necessary, as with the first construction.

Without limiting myself to the precise construction and arrangement of parts shown and described, I claim—

1. The within-described improvement in the manufacture of tire-covers for wheeled vehicles, the same consisting in first forming a cylindrical ring from any suitable fabric coated with rubber or a substitute material, then expanding the said ring by a pressure outward at the center thereof, thus bringing the edges parallel to each other, and forming a U-shaped ring, substantially as set forth.

2. In the manufacture of tire-covers for velocipedes first forming a cylindrical ring of suitably-coated fabric, then introducing and expanding a former within said ring to distend the center of the latter and then molding and vulcanizing the ring upon the former, substantially as set forth.

3. An apparatus for forming and vulcanizing tires of velocipedes provided with an expansible former, means for expanding and contracting the same, and with a two-part vulcanizing-mold adapted to receive the former when expanded, substantially as set forth.

4. The combination of a two-part vulcanizing-mold, means for moving one of the parts to and from the other, expansible former between the said parts and means for expanding the former and moving it to and from one of the parts, substantially as set forth.

5. The within-described expansible former for making tire-covers for velocipedes, the same consisting of a series of sections 5, with inclined ends, a series of wedge-like sections 6, and a frame carrying all of the sections and means for carrying them outward and inward on radial paths.

6. The combination of the segmental sections 5, wedge-sections 6, guides for the said sections and links uniting the sections, substantially as set forth.

7. The combination of the separable dies, a frame E carrying one of the dies, an expansible former and a frame carrying the same, levers H having bearings upon the frame E, and connected with sections of the former, and an engine K for raising and lowering the frame E, substantially as set forth.

8. An apparatus for forming and vulcanizing tires of velocipedes provided with an expansible former and with a vulcanizing-mold adapted to receive the former when expanded, substantially as set forth.

9. An apparatus for forming and vulcanizing tires of velocipedes provided with an expansible former, and with a two-part vulcanizing-mold adapted to receive the former when expanded, and guides for carrying the former to and from one part of the mold and for carrying the other part to and from the former, substantially as set forth.

In testimony whereof I have signed my name to this specification in the presence of two subscribing witnesses.

HENRY J. DOUGHTY.

Witnesses:
ROSE N. CALLAN,
THOMAS MILLER.